United States Patent
Cho et al.

(10) Patent No.: US 8,419,880 B2
(45) Date of Patent: Apr. 16, 2013

(54) METHOD OF TRANSFERRING GRAPHENE

(75) Inventors: Se-hoon Cho, Changwon (KR);
Dong-kwan Won, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 20 days.

(21) Appl. No.: 13/162,855

(22) Filed: Jun. 17, 2011

(65) Prior Publication Data

US 2011/0308717 A1    Dec. 22, 2011

(30) Foreign Application Priority Data

Jun. 17, 2010    (KR) .................... 10-2010-0057569

(51) Int. Cl.
*B44C 1/00* (2006.01)
*B29C 65/48* (2006.01)
*B32B 37/12* (2006.01)
*B32B 37/18* (2006.01)
*B32B 43/00* (2006.01)
*C01B 31/04* (2006.01)

(52) U.S. Cl.
USPC ............ 156/230; 156/241; 156/249; 423/448

(58) Field of Classification Search .................. 156/230, 156/232, 233, 234, 239, 240, 241, 247, 249; 423/448
See application file for complete search history.

(56) References Cited

U.S. PATENT DOCUMENTS
2011/0070146 A1*  3/2011  Song et al. .................... 423/448

FOREIGN PATENT DOCUMENTS
JP          2011063506 A  *  3/2011

OTHER PUBLICATIONS

English Abstract of JP 2011-063506.*

* cited by examiner

*Primary Examiner* — Sing P Chan
(74) *Attorney, Agent, or Firm* — Sughrue Mion, PLLC

(57) ABSTRACT

A method of transferring graphene, the method including: preparing a graphene forming structure including a base member, an oxide layer that is hydrophilic and is formed on the base member, a metal catalyst layer that is hydrophobic and is formed on the oxide layer, and graphene that is formed on the metal catalyst layer; attaching the graphene forming structure on a surface of a first carrier; separating the oxide layer from the metal catalyst layer by applying steam to the graphene forming structure; and removing the metal catalyst layer.

20 Claims, 6 Drawing Sheets

METHOD OF TRANSFERRING GRAPHENE

CROSS-REFERENCE TO RELATED PATENT APPLICATION

This application claims priority from Korean Patent Application No. 10-2010-0057569, filed on Jun. 17, 2010, in the Korean Intellectual Property Office, the disclosure of which is incorporated herein in its entirety by reference.

BACKGROUND

1. Field

Methods consistent with exemplary embodiments relate to transferring graphene, and more particularly, to transferring graphene formed in a graphene forming structure.

2. Description of the Related Art

Recently, interest in carbon materials including fullerenes formed of carbon, carbon nanotubes, graphene, graphite, or the like has increased.

In particular, research on carbon nanotubes and graphene has been actively performed. In this regard, graphene can be formed in a large-scale, is electrically, mechanically, and chemically stable, and has excellent conductivity, and thus, graphene has become in demand as a base material for an electronic circuit.

Recently, a technology for large-scale manufacturing of graphene has been greatly developed, and a study "Large-scale pattern growth of graphene films for stretchable transparent electrodes" published Jan. 14, 2009 in the journal "Nature" (refer to Nature07719) discloses a graphene manufacturing process using chemical vapor deposition (CVD).

The graphene manufacturing process using CVD is described below.

First, a silicon wafer having a silicon dioxide ($SiO_2$) layer is prepared. Afterward, a metal catalyst including nickel (Ni), copper (Cu), aluminum (Al), iron (Fe), or the like is deposited on the $SiO_2$ layer by using a sputtering device, an e-beam evaporator, or the like, and by doing so, a metal catalyst layer is formed.

Next, the silicon wafer having the metal catalyst layer formed thereon, and a gas such as $CH_4$, $C_2H_2$, $C_2H_4$, CO, or the like including carbon are put into a reactor for inductive coupled plasma CVD (ICP-CVD), and then, are heated. Thus, carbon is absorbed into the metal catalyst layer. Afterward, graphene is grown by performing a rapid cooling operation to separate carbon from the metal catalyst layer and to crystallize carbon.

SUMMARY

One or more exemplary embodiments provide a method of transferring graphene, performed to easily transfer graphene from a graphene forming structure in which the graphene is formed.

According to an aspect of an exemplary embodiment, there is provided a method of transferring graphene, the method including: preparing a graphene forming structure comprising a base member, an oxide layer that is hydrophilic and is formed on the base member, a metal catalyst layer that is hydrophobic and is formed on the oxide layer, and graphene that is formed on the metal catalyst layer; attaching the graphene forming structure on a surface of a first carrier; separating the oxide layer from the metal catalyst layer by applying steam to the graphene forming structure; and removing the metal catalyst layer.

The base member may include silicon (Si).

The oxide layer may be formed of silicon dioxide ($SiO_2$).

The metal catalyst layer may comprise at least one of nickel (Ni), copper (Cu), aluminum (Al), iron (Fe), cobalt (Co) and tungsten (W).

The first carrier may be formed of a flexible material and may be partly wound around a roll, whereby the first carrier is transported by roll-to-roll processing.

The first carrier may be formed of a thermal release tape having at least one adhesive surface formed thereon.

The method may further include, after the removing the metal catalyst layer, attaching the graphene on a second carrier, separating the graphene from the first carrier by applying heat to the first carrier, and transferring the graphene to the second carrier.

The attaching the graphene forming structure on the surface of the first carrier may include attaching the graphene forming structure on the surface of the first carrier by pushing an adhesive surface of the first carrier toward the graphene.

In order to push the adhesive surface of the first carrier toward the graphene, the attaching may include the operation of injecting pressurized air toward a surface opposite to the adhesive surface among surfaces of the first carrier.

The separating the oxide layer from the metal catalyst layer may include injecting pressurized air to the graphene forming structure along with the steam.

The pressurized air may be injected by an air knife device.

Between the separating the oxide layer from the metal catalyst layer and the removing the metal catalyst layer, the method may further include forming an etching resist on the metal catalyst layer, wherein the etching resist has a predetermined pattern.

The method may further include moving the first carrier, on which the graphene forming structure is attached, in a first direction after the graphene forming structure is attached on the first carrier, and changing the direction of the moving the first carrier when the separating begins so that the oxide layer and the base member moves in the first direction, and the metal catalyst layer and the graphene along with the first carrier moves in a second direction, wherein, in the separating the oxide layer from the metal catalyst layer, the steam is applied to a front edge of the graphene forming structure.

The oxide layer and the base member separated from the metal catalyst layer via the separating the oxide layer from the metal catalyst layer may be transported to be distant from the first carrier.

The removing the metal catalyst layer may include an etching process that is performed using an etching solution comprising at least one of acid, hydrogen fluoride (HF), buffered oxide etch (BOE), a $FeCl_3$ solution and a $Fe(NO_3)_3$ solution.

The method may further include, after the removing the metal catalyst layer, attaching the graphene on a second carrier, separating the graphene from the first carrier, and transferring the graphene to the second carrier.

The method may also further include, after the removing the metal catalyst layer, removing a portion of the graphene.

BRIEF DESCRIPTION OF THE DRAWINGS

The above and other aspects will become more apparent by describing in detail exemplary embodiments with reference to the attached drawings, in which.

DETAILED DESCRIPTION EXEMPLARY EMBODIMENTS

Figure 1:
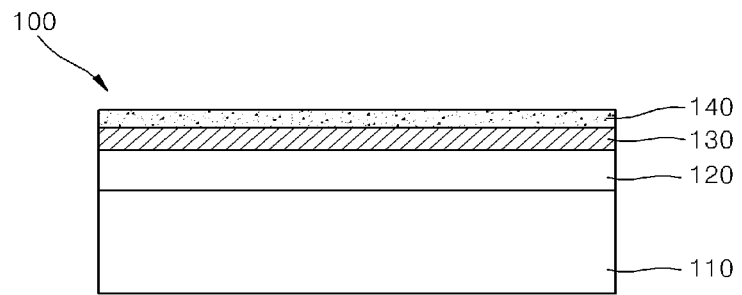
FIG. 1 is a cross-sectional view of a graphene forming structure according to an exemplary embodiment.

Hereinafter, exemplary embodiments will be described in detail with reference to the attached drawings. Like reference numerals in the drawings denote like elements having substantially the same configurations, and thus, their descriptions will not be repeated. Also, a thickness and a size of each component may be exaggerated for clarity.

FIG. 1 is a cross-sectional view of a graphene forming structure 100 according to an exemplary embodiment. Here, the term "graphene forming structure" denotes a structure in which graphene is sufficiently grown by using a chemical vapor deposition (CVD) process described above in the "Description of the Related Art" section. That is, the graphene forming structure 100 according to the present exemplary embodiment includes graphene 140 that is fully grown and is sufficient to be used but has not been transferred yet.

Referring to FIG. 1, the graphene forming structure 100 will now be described.

The graphene forming structure 100 includes a base member 110, an oxide layer 120, a metal catalyst layer 130, and the graphene 140.

The base member 110 is formed of a silicon wafer.

In the present exemplary embodiment, the base member 110 is formed of a silicon wafer but one or more exemplary embodiments may not be limited thereto. That is, a material for forming the base member 110 is not limited to the silicon wafer.

The oxide layer 120 is formed of silicon dioxide ($SiO_2$), and its thickness is equal to or greater than 300 nm. Due to a characteristic of silicon oxide, the oxide layer 120 is hydrophilic.

In the present exemplary embodiment, the oxide layer 120 is formed of $SiO_2$, but one or more exemplary embodiments may not be limited thereto. That is, as long as a material for forming the oxide layer 120 is hydrophilic and allows the metal catalyst layer 130 to be easily formed, the material for forming the oxide layer 120 is not limited to $SiO_2$.

The metal catalyst layer 130 is formed of nickel (Ni), is formed on the oxide layer 120 by using a sputtering method, and a thickness of the metal catalyst layer 130 is equal to or greater than 100 nm. Due to a characteristic of Ni, the metal catalyst layer 130 is hydrophobic.

In the present exemplary embodiment, the metal catalyst layer 130 is formed of Ni, but one or more exemplary embodiments are not limited thereto. That is, as long as a material for forming the metal catalyst layer 130 grows graphene by absorbing carbon when the CVD process is performed, and is hydrophobic, the material for forming the metal catalyst layer 130 is not limited to Ni. For example, the material for forming the metal catalyst layer 130 may include copper (Cu), aluminum (Al), iron (Fe), cobalt (Co), tungsten (W), or the like.

The graphene 140 has a very thin plate or film shape, and is formed in a single layer or multiple layers by covalent bonds between carbon atoms. By performing the CVD process, the graphene 140 is grown on a top surface of the metal catalyst layer 130 and has the film shape.

Hereinafter, referring to FIGS. 2 through 8, a method of transferring graphene according to an exemplary embodiment will now be described.

Figure 2:
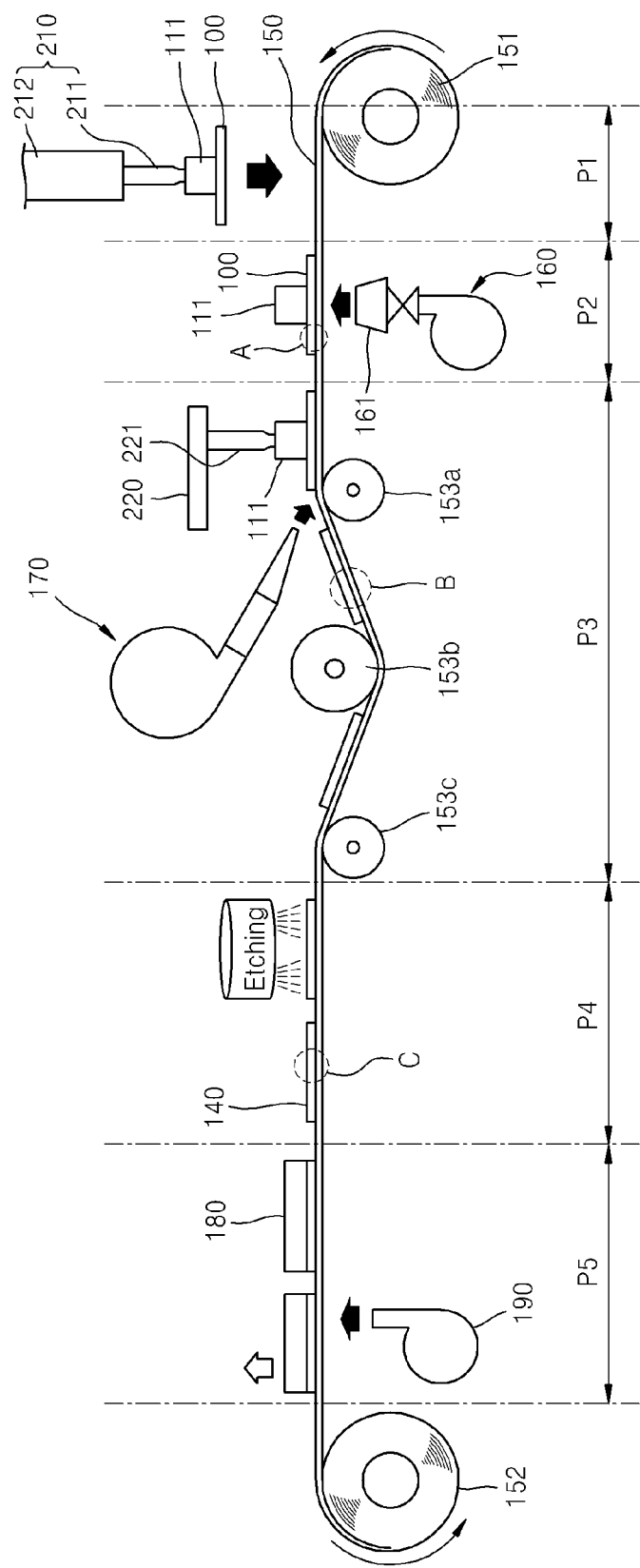
FIG. 2 illustrates a method of transferring graphene, according to an exemplary embodiment.
Figure 3:
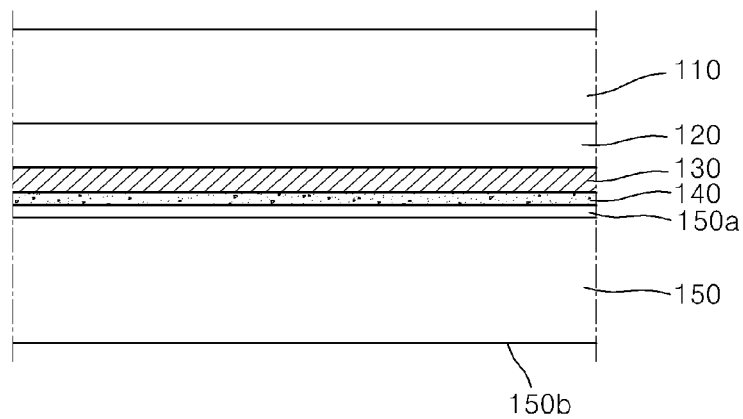
FIG. 3 is a cross-sectional view, magnifying a portion A of FIG. 2, according to an exemplary embodiment.
Figure 4:
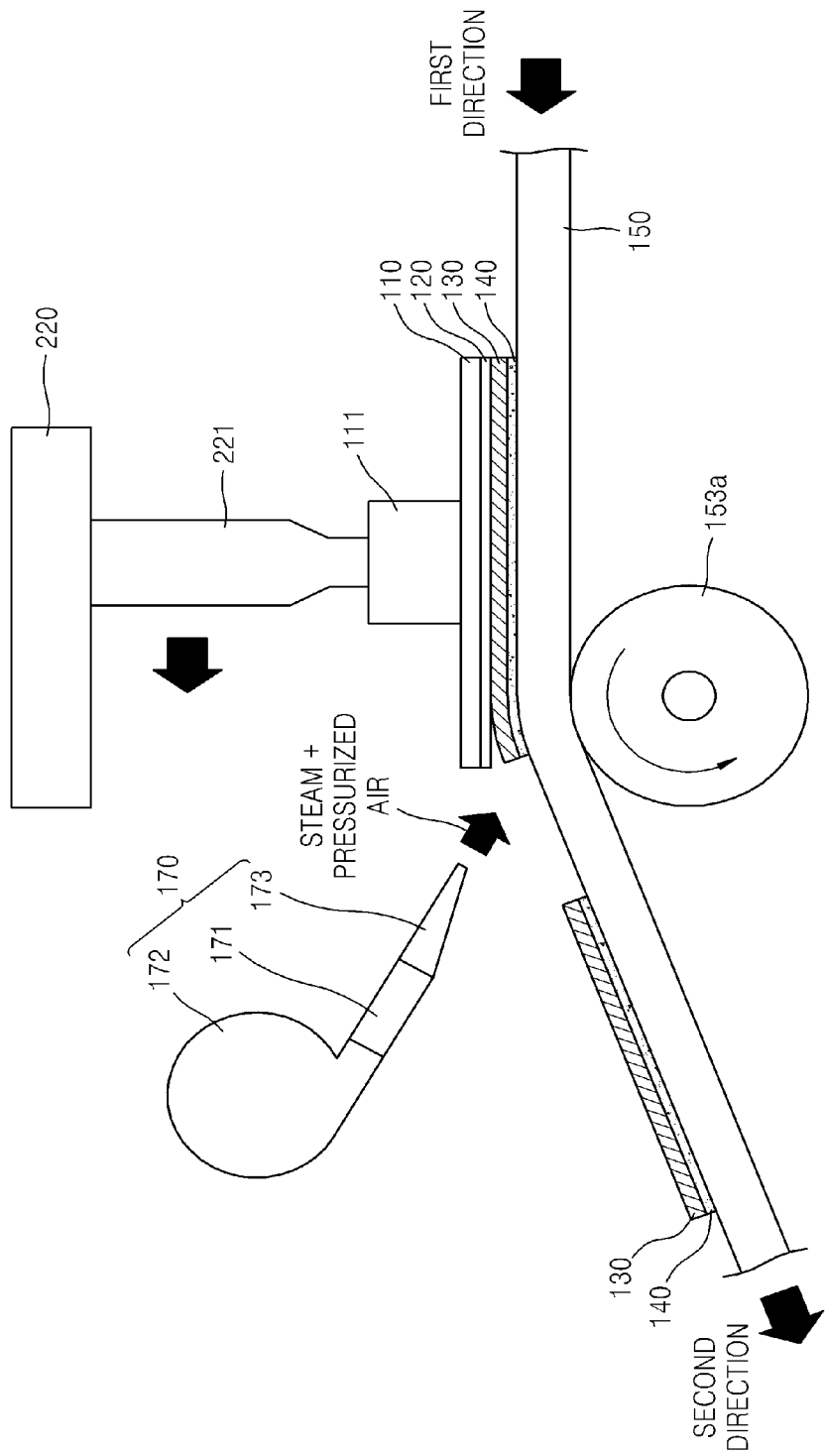
FIG. 4 is a diagram magnifying a part of a working area P3 of FIG. 2, according to an exemplary embodiment.
Figure 5:
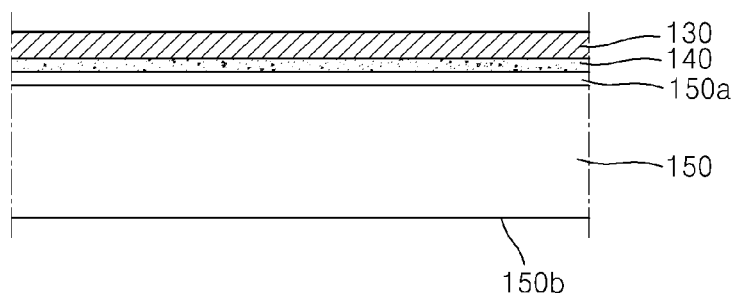
FIG. 5 is a cross-sectional view, magnifying a portion B of FIG. 2, according to an exemplary embodiment.
Figure 6:
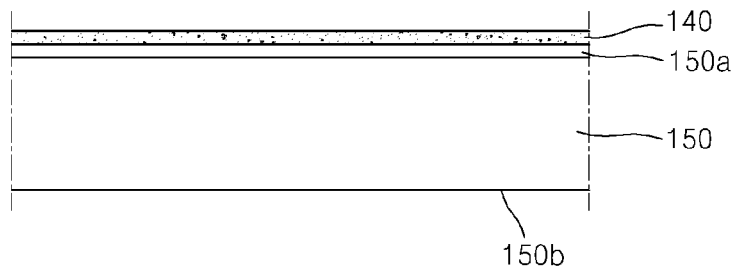
FIG. 6 is a cross-sectional view, magnifying a portion C of FIG. 2, according to an exemplary embodiment.
Figure 7:
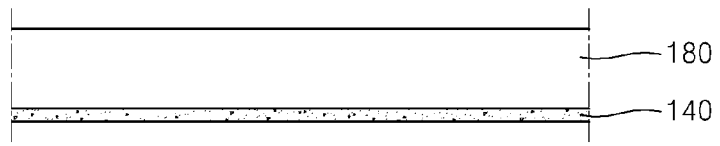
FIG. 7 is a cross-sectional view illustrating graphene transferred to a second carrier, according to an exemplary embodiment.
Figure 8:
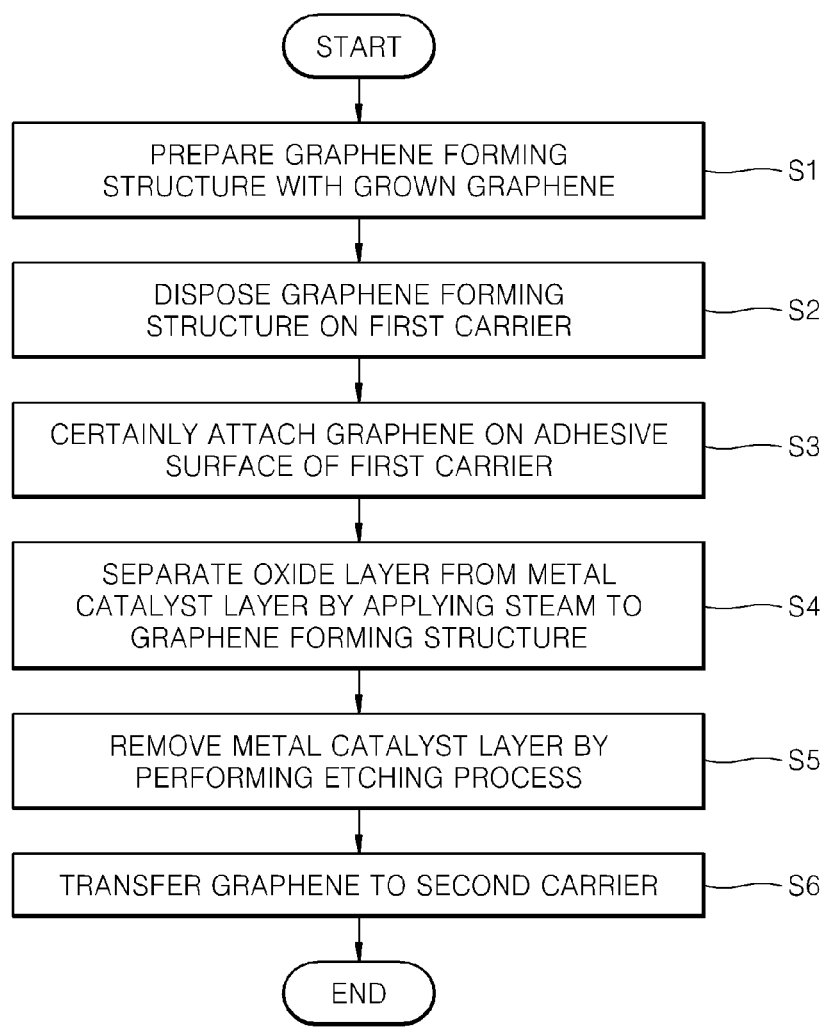
FIG. 8 is a flowchart of the method of transferring graphene, according to an exemplary embodiment.

FIG. 2 illustrates the method of transferring graphene according to the present exemplary embodiment. FIG. 3 is a cross-sectional view, magnifying a portion A of FIG. 2. FIG. 4 is a diagram magnifying a part of a working area P3 of FIG. 2. FIG. 5 is a cross-sectional view, magnifying a portion B of FIG. 2. FIG. 6 is a cross-sectional view, magnifying a portion C of FIG. 2. FIG. 7 is a cross-sectional view illustrating graphene transferred to a second carrier. FIG. 8 is a flowchart of the method of transferring graphene, according to an exemplary embodiment.

First, as described above, the graphene forming structure 100 is provided, in which graphene is sufficiently grown by using the CVD process (operation S1).

Next, as illustrated in FIG. 2, a supporting member 111 having a cylindrical-shape is attached on the graphene forming structure 100, and the graphene forming structure 100 is disposed on a first carrier 150 while held by the supporting member 111 (operation S2).

That is, the graphene forming structure 100 is disposed on a working area P1 of the first carrier 150, and for this disposing, the supporting member 111, which is attached on a top surface of the base member 110, and a structure disposing device 210 may be used. By doing so, the graphene forming structure 100 is disposed on the first carrier 150.

The structure disposing device 210 may be a robotic device automatically controlled by a computer, and includes an adhesion device 211 and an adhesion-device driving unit 212. Here, the adhesion device 211 functions to hold the supporting member 111, and due to its internal vacuum state, the adhesion device 211 holds the supporting member 111.

In the present exemplary embodiment, in order to dispose the graphene forming structure 100 on the first carrier 150, the supporting member 111 is separately attached on the base member 110, but one or more exemplary embodiments are not limited thereto. For example, in another exemplary embodiment, the supporting member 111 may not be attached on the base member 110. In this case, the adhesion device 211 lifts up the graphene forming structure 100 by directly adhering to a surface of the base member 110, and then, disposes the graphene forming structure 100 on the first carrier 150.

Also, in the present exemplary embodiment, the graphene forming structure 100 is disposed on the first carrier 150 by using the structure disposing device 210 but one or more exemplary embodiments are not limited thereto. For example, in another exemplary embodiment, the graphene forming structure 100 may be disposed manually on the first carrier 150 without using the structure disposing device 210. Also, the graphene forming structure 100 may be disposed on the first carrier 150 by using a disposing device having a structure different from the structure disposing device 210.

The first carrier 150 is formed of a thermal release tape having characteristic of flexibility. A generally used thermal release tape may be directly employed as the thermal release tape to form the first carrier 150. Since the thermal release tape has an adhesive surface 150a, when the graphene forming structure 100 is manually disposed on the first carrier 150 or by using the structure disposing device 210, the graphene 140 of the graphene forming structure 100 is disposed to contact the adhesive surface 150a of the first carrier 150.

Although the first carrier 150 according to the present exemplary embodiment is formed of a thermal release tape, one or more exemplary embodiments are not limited thereto. That is, a material and a shape of the first carrier 150 are not specifically limited. In other word, when the first carrier 150 is attached on or detached from the graphene 140, as long as a material for forming the first carrier 150 may not damage, or may minimize damage to, a surface of the graphene 140, the material for forming the first carrier 150 is not limited.

The first carrier 150 is partly wound up around a supplying roll 151 and a collecting roll 152, and during a transport operation, according to roll-to-roll processing, the first carrier 150 is released from the supplying roll 151 and is transported to the collecting roll 152.

Although the first carrier 150 according to the present exemplary embodiment is transported according to the roll-to-roll processing, one or more exemplary embodiments are not limited thereto. That is, methods of transporting the first carrier 150 are not limited. For example, the first carrier 150 may be formed to have a plate shape, a separate conveyor belt transporting equipment may be arranged, and then, the first carrier 150 may be put on a conveyor belt and transported.

Afterward, as illustrated in FIG. 2, when the first carrier 150 arrives at a working area P2, pressurized air pushes the first carrier 150 toward the graphene 140, so that the graphene 140 is certainly attached on the adhesive surface 150*a* of the first carrier 150 (operation S3).

For this operation S3, a pressurized air injector 160 is arranged below the first carrier 150, a nozzle 161 of the pressurized air injector 160 faces a bottom surface 150*b* of the first carrier 150, and then, the pressurized air is injected. Since the bottom surface 150*b* of the first carrier 150 is a surface opposite to the adhesive surface 150*a*, when the pressurized air injected from the nozzle 161 presses against the bottom surface 150*b*, the first carrier 150 is pushed toward the graphene 140, so that the graphene 140 is certainly attached on the adhesive surface 150*a*. According to the present exemplary embodiment, to attach the graphene 140 on the adhesive surface 150*a* of the first carrier 150, physical contact pressing using a solid pressing member is not performed, and thus, when an attaching operation is performed, damage to a surface of the graphene 140 is minimized.

In the present exemplary embodiment, the pressurized air is injected so that the first carrier 150 is pushed toward the graphene 140, and by doing so, the graphene 140 is certainly attached on the adhesive surface 150*a*, but one or more exemplary embodiments are not limited thereto. For example, a roller contacting the bottom surface 150*b* of the first carrier 150 may be separately arranged, and the roller may press against the bottom surface 150*b* of the first carrier 150, so that the graphene 140 and the adhesive surface 150*a* of the first carrier 150 may be certainly attached to each other.

When operations S1 though S3 are complete, as illustrated in FIG. 3, the graphene 140 is certainly attached on the adhesive surface 150*a* of the first carrier 150.

Afterward, as illustrated in FIG. 2, when the first carrier 150 enters the working area P3, the graphene forming structure 100 attached on the first carrier 150 reaches a high-pressure steam injection place. Next, steam is injected to the graphene forming structure 100 by using a steam injector 170, so that the oxide layer 120 is separated from the metal catalyst layer 130 due to the steam (operation S4).

That is, as illustrated in FIGS. 2 and 4, the steam injector 170 injects the steam toward the graphene forming structure 100, and the injected steam separates the oxide layer 120 from the metal catalyst layer 130 by permeating between the oxide layer 120 and the metal catalyst layer 130. Here, a steam injection direction is opposite to a processing direction of the first carrier 150. In addition, the steam injector 170 also injects high-temperature pressurized air. The injection of the high-temperature pressurized air not only facilitates permeation of the steam between the oxide layer 120 and the metal catalyst layer 130 but also helps the separation of the oxide layer 120 from the metal catalyst layer 130 by supplying additional heat to the injected steam.

That is, since the oxide layer 120 is hydrophilic whereas the metal catalyst layer 130 is hydrophobic, when the steam permeates therebetween, the oxide layer 120 and the metal catalyst layer 130 are separated. In addition, when the steam receives additional heat, is supplied energy enabling phase-change, or enters an atmosphere enabling phase-change, the steam tends to expand by more than several hundreds times its original volume. Thus, when the high-temperature pressurized air is supplied to the steam, heat is additionally supplied to the injected steam so that it is possible to easily separate the oxide layer 120 and the metal catalyst layer 130.

In the present exemplary embodiment, operation S3 for attaching the graphene 140 on the first carrier 150, and operation S4 for separating the oxide layer 120 from the metal catalyst layer 130 are separately performed, but one or more exemplary embodiments are not limited thereto. For example, in another exemplary embodiment, operation S3 and operation S4 may be performed almost at the same time. That is, when a preceding part of a graphene forming structure 100 has undergone operation S3 and then is currently undergoing operation S4, a following part of the graphene forming structure 100 may undergo operation S3. That is, operations S3 and S4 may be simultaneously performed on one graphene forming structures 100, and in this case, operations S3 and S4 may be performed in physically the same place.

The steam injector 170 according to the present exemplary embodiment not only injects the steam but also injects the high-temperature pressurized air, but one or more exemplary embodiments are not limited thereto. For example, in another exemplary embodiment, the steam injector 170 may be configured to inject only the steam without injecting the high-temperature pressurized air.

Here, as illustrated in FIG. 4, the steam injector 170 includes a steam supplying unit 171, a high-temperature/high-pressure air injecting unit 172 having a heater mounted thereon, and an injection nozzle 173.

The steam supplying unit 171 functions to supply the steam, the high-temperature/high-pressure air injecting unit 172 functions to inject the high-temperature pressurized air, and the injection nozzle 173 functions to inject the steam and the high-temperature pressurized air toward the graphene forming structure 100 by increasing a speed of the steam and the high-temperature pressurized air. Here, the high-temperature/high-pressure air injecting unit 172 may be formed as an air knife device having the heater mounted thereon. In addition, whether to apply a high temperature or a high pressure is determined by selectively operating the heater in consideration of a process speed of operation S4 or a size of the graphene forming structure 100, and thus it is possible to adjust a level of the high temperature or a level of the high pressure.

In the present exemplary embodiment, the high-temperature/high-pressure air injecting unit 172 is disposed at a rear side of the steam supplying unit 171, but one or more exemplary embodiments are not limited thereto. For example, in another exemplary embodiment, the high-temperature/high-pressure air injecting unit 172 may be disposed at a front side of the steam supplying unit 171.

In operation S4, as illustrated in FIGS. 2 and 4, the process direction of the first carrier 150 is changed by disposition of guide rollers 153a, 153b, and 153c. That is, in operation S3, the process direction of the first carrier 150 is parallel to a process direction of the base member 110 (refer to FIG. 4 illustrating an arrow indicating a first direction), but in operation S4, the process direction of the first carrier 150 is changed to be inclined to the process direction of the base member 110 (refer to FIG. 4 illustrating an arrow indicating a second direction). This change helps the separation between the oxide layer 120 and the metal catalyst layer 130 by moving downward the metal catalyst layer 130 and the graphene 140 separated from the oxide layer 120 due to the steam.

When the first carrier 150 enters the working area P3, a second adhesion device 221 adheres to the supporting member 111 attached on the top surface of the base member 110. The second adhesion device 221 horizontally moves at the same speed as a moving speed of the first carrier 150 while the second adhesion device 221 adheres to the supporting member 111. The second adhesion device 221 is horizontally transported by a second adhesion-device transporting device 220. Here, the second adhesion-device transporting device 220 may be a robotic device automatically controlled by a computer, and may include a well known configuration.

The aforementioned feature is in association with the change in the process direction of the first carrier 150 (the change from the first direction to the second direction in FIG. 4), and thus, helps the separation between the oxide layer 120 and the metal catalyst layer 130. That is, although the process direction of the first carrier 150 is changed from the first direction in FIG. 4 to the inclined direction (the second direction in FIG. 4), the second adhesion device 221 continually moves in the original direction (the first direction in FIG. 4). By doing so, the base member 110 and the oxide layer 120 attached on the supporting member 111 continually move in the first direction, thereby facilitating the separation between the oxide layer 120 and the metal catalyst layer 130. When operation S4 is complete, the separated base member 110 and oxide layer 120 are transported by the second adhesion-device transporting device 220, and afterward, the separated base member 110 and oxide layer 120 may undergo a separate post-treatment, and then, may be transported to where a process for synthesizing graphene is performed, or may be disused or reused after a post-process in a separate place.

After operation S4 is performed, as illustrated in FIG. 5, only the graphene 140 and the metal catalyst layer 130 are left on a top surface of the first carrier 150.

Afterward, as illustrated in FIG. 2, when the first carrier 150 enters a working area P4, an etching process is performed to remove the metal catalyst layer 130 (operation S5).

Here, the etching process is performed using an etching solution, and examples of the etching solution may be acid, hydrogen fluoride (HF), buffered oxide etch (BOE), a $FeCl_3$ solution, a $Fe(NO_3)_3$ solution, and the like.

The etching process according to the present exemplary embodiment is a wet etching process using the etching solution but one or more exemplary embodiments are not limited thereto. For example, in another exemplary embodiment, the metal catalyst layer 130 may be removed by using a dry etching process or a sputtering method.

In the present exemplary embodiment, the metal catalyst layer 130 is completely removed by performing the etching process but one or more exemplary embodiments are not limited thereto. For example, in another exemplary embodiment, the etching process in operation S5 may selectively remove the metal catalyst layer 130 by previously forming an etching resist having a predetermined pattern on the metal catalyst layer 130, and then, by performing the etching process.

That is, before operation S5, the etching resist is pattern-formed on the metal catalyst layer 130 by performing an exposing and developing process using a photosensitive photoresist, and then, the etching process is performed, so that a portion of the metal catalyst layer 130 not under the pattern may be removed. Here, only a side edge of the metal catalyst layer 130 may be left so as to reinforce a tensile strength in a process direction of sequential processes. Also, in order to additionally form a circuit pattern of the graphene 140, after the pattern etching process with respect to the metal catalyst layer 130 is complete, the graphene 140 may be partially removed according to the pattern of the metal catalyst layer 130 by UV irradiation or laser irradiation using mask so that it is possible to form the circuit pattern on the graphene 140 and the metal catalyst layer 130, which are integratedly stacked. Afterward, the circuit pattern of the graphene 140 and the metal catalyst layer 130 may be transferred to a second carrier 180.

As described above, when operation S5 is complete, as illustrated in FIG. 6, only the graphene 140 is left on the top surface of the first carrier 150.

Afterward, when the first carrier 150 enters a working area P5, the second carrier 180 is prepared and attached on the graphene 140, removes adhesion of the adhesive surface 150a by applying heat to the first carrier 150, and then, transferring the graphene 140 on the second carrier 180 (operation S6).

Since the first carrier 150 is a thermal release tape, when the first carrier 150 is heated, the adhesion of the first carrier 150 is removed at a predetermined temperature. In the present exemplary embodiment, in order to apply heat to the first carrier 150, hot wind is applied to the first carrier 150. For this application, a hot air heater 190 having a heater is used.

In the present exemplary embodiment, the adhesion of the adhesive surface 150a of the first carrier 150 is removed by using the hot air heater 190, but one or more exemplary embodiments are not limited thereto. For example, in another exemplary embodiment, without using the hot air heater 190, heat may be applied to the adhesive surface 150a of the first carrier 150 by thermal radiation.

Similar to the first carrier 150, the second carrier 180 may be formed of a thermal release tape but may be formed of another material. For example, the second carrier 180 may include polydimethylsiloxane (PDMS), polyethylen terephthalate (PET), a polyimide film, glass, a synthetic rubber, a natural rubber, or the like, and may be a substrate whereon a direct circuit pattern is formed.

When operation S6 is complete, as illustrated in FIG. 7, the graphene 140 is transferred to the second carrier 180. In addition, the first carrier 150 separated from the graphene 140 is collected by being wound around the collecting roll 152.

In the present exemplary embodiment, a transferring operation includes operation S6 so that the transferring operation includes a process of transferring the graphene 140 to the second carrier 180, but one or more exemplary embodiments are not limited thereto. For example, in another exemplary embodiment, after operation S5 is performed, a thin protective film is disposed on a surface of the graphene 140 or a protective coating process is performed on the surface of the graphene 140, and then, the first carrier 150 on which the graphene 140 is disposed is collected by wound around the collecting roll 152. By doing so, the collecting roll 152 may correspond to a final product.

In this case, since the first carrier 150 is wound around the collecting roll 152, a manufacturer purchases the collecting roll 152, attaches the graphene 140 on a desired object (e.g., a circuit substrate, a display panel substrate, or the like), and then, separates the first carrier 150 from the graphene 140 by applying heat to the first carrier 150, that is, the thermal release tape. By doing so, the manufacturer may transfer the graphene 140 to the desired object.

As described above, according to the one or more exemplary embodiments, in consideration of the fact that the oxide layer 120 is hydrophilic whereas the metal catalyst layer 130 is hydrophobic, the separation between the oxide layer 120 and the metal catalyst layer 130 is accelerated by using the steam, so that the graphene 140 may be rapidly transferred.

Also, according to the one or more exemplary embodiments, the graphene 140 is transferred while the first carrier 150 is transported according to the roll-to-roll processing, so that a relatively large amount of the graphene 140 may be rapidly transferred.

The graphene 140 transferred according to the one or more embodiments may be used in various applications including a transparent electrode, a conductive thin film, a radiating or heating device, a flexible display device, a touch screen, an organic light-emitting device (LED), a dye-sensitized solar cell electrode, or the like.

According to the method of transferring graphene according to the one or more exemplary embodiments, graphene may be easily transferred from a graphene forming structure in which the graphene is formed.

While the exemplary embodiments have been particularly shown and described, it will be understood by those of ordinary skill in the art that various changes in form and details may be made therein without departing from the spirit and scope of the inventive concept as defined by the following claims.

What is claimed is:

1. A method of transferring graphene, the method comprising:
   preparing a graphene forming structure comprising a base member, an oxide layer that is hydrophilic and is formed on the base member, a metal catalyst layer that is hydrophobic and is formed on the oxide layer, and graphene that is formed on the metal catalyst layer;
   attaching the graphene forming structure on a surface of a first carrier;
   separating the oxide layer from the metal catalyst layer by applying steam to the graphene forming structure; and
   removing the metal catalyst layer.

2. The method of claim 1, wherein the base member comprises silicon (Si), and the oxide layer is formed of silicon dioxide ($SiO_2$).

3. The method of claim 1, wherein the attaching the graphene forming structure on the surface of the first carrier comprises attaching the graphene on the surface of the first carrier.

4. The method of claim 1, wherein the metal catalyst layer comprises at least one of nickel (Ni), copper (Cu), aluminum (Al), iron (Fe), cobalt (Co) and tungsten (W).

5. The method of claim 1, wherein the first carrier is formed of a flexible material and is partly wound around a roll, whereby the first carrier is transported by roll-to-roll processing.

6. The method of claim 1, wherein the first carrier is formed of a thermal release tape having at least one adhesive surface formed thereon.

7. The method of claim 6, further comprising:
   after the removing the metal catalyst layer, attaching the graphene on a second carrier;
   separating the graphene from the first carrier by applying heat to the first carrier; and
   transferring the graphene to the second carrier.

8. The method of claim 1, wherein the attaching the graphene forming structure on the surface of the first carrier comprises attaching the graphene forming structure on the first carrier by pushing an adhesive surface of the first carrier toward the graphene.

9. The method of claim 8, wherein, in order to push the adhesive surface of the first carrier toward the graphene, the attaching the graphene forming structure on the surface of the first carrier comprises injecting pressurized air toward a surface opposite to the adhesive surface among surfaces of the first carrier.

10. The method of claim 1, wherein the separating comprises injecting pressurized air to the graphene forming structure along with the steam.

11. The method of claim 10, wherein the pressurized air is injected by an air knife device.

12. The method of claim 1, further comprising, between the separating the oxide layer from the metal catalyst layer and the removing the metal catalyst layer, forming an etching resist on the metal catalyst layer, wherein the etching resist has a predetermined pattern.

13. The method of claim 1, further comprising:
   moving the first carrier, on the surface of which the graphene forming structure is attached, in a first direction after the graphene forming structure is attached on the first carrier; and
   changing the direction of the moving the first carrier when the separating begins so that the oxide layer and the base member moves in the first direction, and the metal catalyst layer and the graphene along with the first carrier moves in a second direction,
   wherein, in the separating the oxide layer from the metal catalyst layer, the steam is applied to a front edge of the graphene forming structure.

14. The method of claim 13, further comprising:
   attaching a device to the base member before the separating the oxide layer from the metal catalyst layer; and
   moving the device in the first direction at a same speed as a speed of the moving the first carrier.

15. The method of claim 14, wherein the separating the oxide layer from the metal catalyst layer begins at the front edge of the graphene forming structure while a rear portion of the graphene forming structure is being attached on the first carrier in the attaching.

16. The method of claim 1, wherein the oxide layer and the base member separated from the metal catalyst layer via the separating the oxide layer from the metal catalyst layer are transported to be distant from the first carrier.

17. The method of claim 1, wherein the removing the metal catalyst layer comprises an etching process that is performed using an etching solution comprising at least one of acid, hydrogen fluoride (HF), buffered oxide etch (BOE), a $FeCl_3$ solution and a $Fe(NO_3)_3$ solution.

18. The method of claim 1, further comprising:
   after the removing the metal catalyst layer, attaching the graphene on a second carrier;
   separating the graphene from the first carrier; and
   transferring the graphene to the second carrier.

19. The method of claim 1, further comprising, after the removing the metal catalyst layer, removing a portion of the graphene.

20. The method of claim 1, further comprising moving the first carrier, on which the graphene forming structure is attached, in a first direction after the graphene forming structure is attached on the first carrier, wherein the separating the oxide layer from the metal catalyst layer is performed while the first carrier is moved.

* * * * *